UNITED STATES PATENT OFFICE.

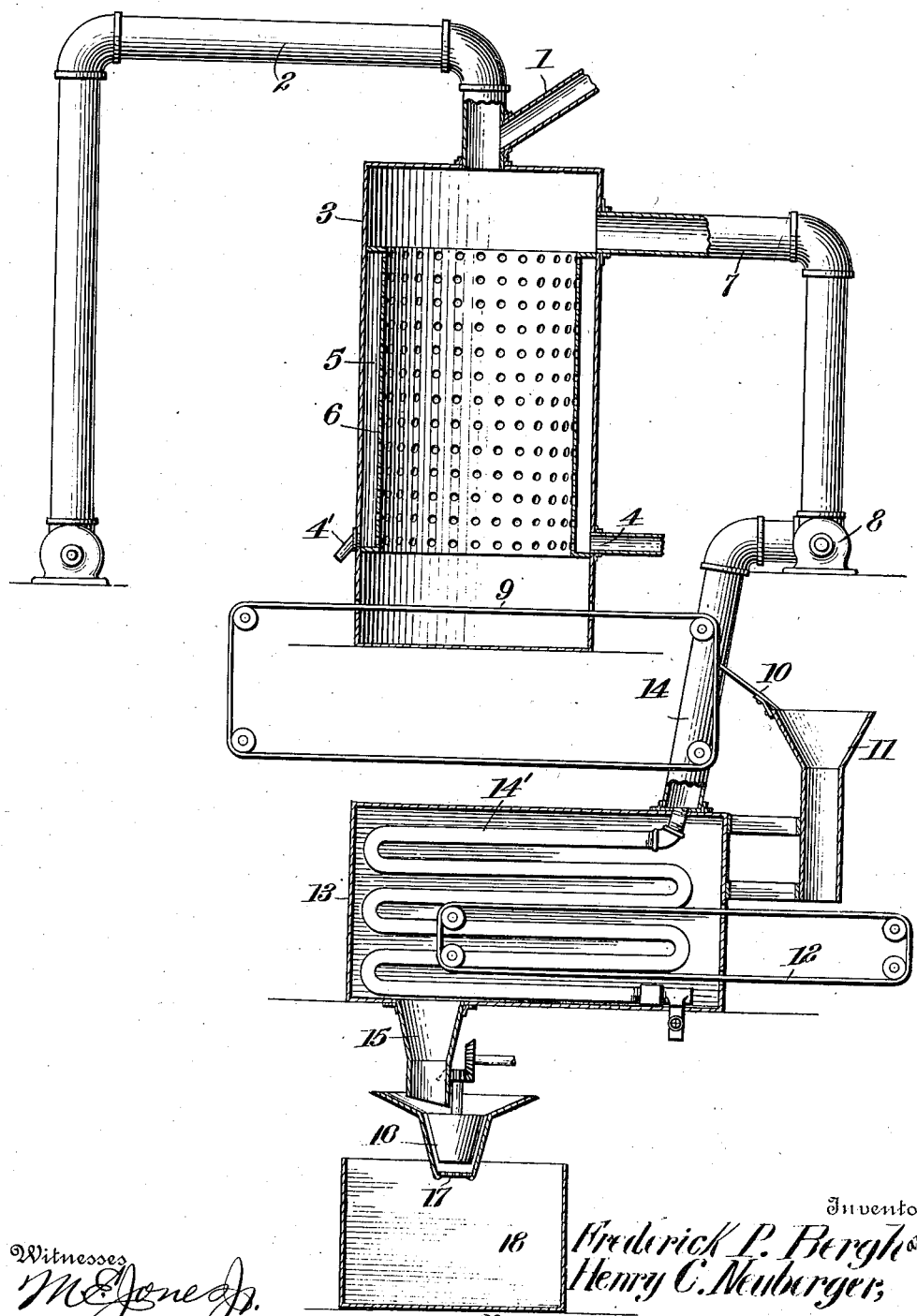

FREDERICK PENTZ BERGH AND HENRY C. NEUBERGER, OF NEW YORK, N. Y., ASSIGNORS, BY MESNE ASSIGNMENTS, TO GENERAL REDUCTION COMPANY, A CORPORATION OF NEW YORK.

PROCESS FOR TREATING STARCH, &c.

1,133,914. Specification of Letters Patent. Patented Mar. 30, 1915.

Application filed April 28, 1911. Serial No. 623,921.

*To all whom it may concern:*

Be it known that we, FREDERICK P. BERGH and HENRY C. NEUBERGER, citizens of the United States, and residents of New York, in the county of New York and State of New York, have invented certain new and useful Improvements in Processes for Treating Starch, &c., of which the following is a specification.
This invention relates to a process for treating green starch and starch in a powdered condition, and its object is to dry the starch from its natural structure, and transform it from a granular powdered or powdery condition and containing a large percentage of moisture into a hydrolized and dry semi-gelatinized state in which the particles of the substance possess a hard, gritty, agglomerate form, whereby the material may be readily handled, conveyed and elevated without loss through dispersion of the particles.

To this end the process consists, broadly stated, of dropping the starch to be treated while containing moisture through an inclosed area and there subjecting it to the action of a heated moisture-bearing body, such as steam, of such a temperature as to semi-gelatinize the starch without reducing it to a paste or jelly and then subjecting such semi-gelatinized product to the action of a heated gaseous body, such as hot air, for the purpose of drying the substance treated and then disintegrating the semi-gelatinized and dried particles into any desired degree of subdivision.

The action of the steam or other vapor-containing gaseous body upon the moisture-containing starch is to heat the starch in its own moisture to the point of semi-gelatinization without subtracting the moisture from the body of the starch, while at the same time, the addition of such an amount of moisture to the starch as would create a jelly or paste is avoided. By this step, the starch is gelatinized and by dropping it from the point of heating through the inclosed area and is thereby formed into a mass of loose, separated, agglomerate particles upon a suitable receptacle and upon being then subjected to the drying action of heated air, the particles take a hard, gritty, angular form with a vitreous surface. By means of a suitable grinding or disintegrating device, in conjunction with a sieve of a required mesh, the particles may be reduced to the desired degree of fineness and starch is then ready for handling and may be easily conveyed and elevated.

Our process may be carried out by the apparatus shown in the accompanying drawings, in which drawings, the view shown is a central vertical section of the parts of the apparatus or system adapted to carry out the successive steps of the process.

Referring to the drawings, 1 designates a pipe or hopper through which the granular green starch or powdered starch is introduced. This pipe leads into a pipe 2 which is for the purpose of admitting air under pressure to a treating chamber 3 or the pipe 1 may lead directly into the chamber 3 immediately adjacent the junction of the latter with the air pipe 2. When starch is to be treated, it is introduced in what is known as its "green" state, in which condition it contains about 50% moisture. If the starch or other material has been so treated prior to its introduction into the chamber by some method that would deprive the same of moisture, then a quantity of water should be added sufficient to supply moisture to about the percentage above stated. The process is particularly applicable and may possibly be found to be only applicable to the treatment of starch and is primarily designed for treating green starch, although also useful for reducing starch in a powdered form to a hard gritty mass capable of elevation without dispersion, and therefore hereafter throughout this specification, the product treated will be referred to as starch, although it is evident that possibly the process may be found of advantage in connection with the treatment of other substances, particularly some of the alteration products of starch. As the starch is poured into the upper end of the chamber, it meets a body of heated moisture-bearing gas or vapor introduced into the chamber below the admission port for the starch. This heating body is preferably steam and it is preferably introduced into the chamber 3 through an opening 4 formed in the side wall of the chamber and communicating with a suitable source of steam supply. The steam entering the opening passes into the vertical chamber 5, formed by the wall of the chamber 3 and by the perforated plate 6, which plate serves to guide the steam upwardly and distribute it over a large area of the interior of the chamber below the entrance port. These perforated plates also serve as baffling means for the steam, which serve to separate the steam from any excess moisture which is allowed to collect at the bottom of the small vertical chambers, where it may be drawn off. From the chamber a pipe 7 leads to a blower 8, whereby the exhaust steam is drawn from the chamber. The water separated from the steam in the chamber 5 may be drawn off through a drip pipe 4'.

The steam entering the chamber meets the descending body of starch and raises the temperature of the starch to such a degree that in conjunction with the moisture contained in the starch and the moisture introduced by the steam, gelatinization or such a cooking of the starch as will effect a partial melting and the agglomeration of its particles will take place. The temperature within the chamber is about 180° F. The air under pressure admitted through the pipe 2 is for the purpose of opposing the counter pressure of the steam and forcing the latter away from the starch entrance so that the starch may freely enter and will not be blown back by the steam pressure.

The semi-gelatinized starch drops down upon suitable receiving means and in the apparatus shown, such receiving means consist of an endless conveying belt 9 extending horizontally through the chamber 3 or across the bottom thereof and continuously driven from any suitable source of power. The starch falls upon the belt in a soft mass of separated, granular particles which are carried forward by the belt into contact with a suitable scraper and chute 10 from which the starch is fed to a hopper 11. Below the lower open end of this hopper is mounted an endless horizontal conveying belt 12 driven by any suitable power and adapted to carry the material deposited from the hopper into a chamber 13 which is subjected to heat of a temperature sufficient to absorb the moisture from the granules, leaving the starch with its particles in a dry, hard, gritty form. The exhaust steam drawn from the chamber 3 through the pipe 7 may pass into the chamber 13 through a pipe 14 to heat the chamber. From the inner end of the conveyer the starch drops from the belt into a hopper 15 leading to a disintegrator 16 which serves to break up the product into finer particles. The degree of fineness for final use is determined by the mesh of a screen or screens 17 placed in the bottom of the disintegrator. From the disintegrator the starch may pass to a suitable receptacle 18 where it is collected for use. In its final form the starch will be in a dry, hard, agglomerate and gritty state, in which condition it may be readily handled and elevated without dispersion into the air such as would occur in handling the starch in the form of a powder.

It is clear that various changes may be made in the form of the apparatus employed to carry out the above steps of our process without departing from the scope of our invention.

Having thus described our invention, what we claim is:—

1. The process of treating starch to expand the cells and reduce it to an agglomeration of starch particles which consist in dropping a body of starch containing moisture substantially equivalent to that contained in green starch through an inclosed area and subjecting the body of starch while so dropping to the action of a moisture carrying heated gaseous body, substantially as described.

2. The process of reducing substances in the form of a powder capable of agglomeration which consists in dropping the powder in the presence of moisture through an inclosed area subject to a heat sufficient to agglomerate the particles, substantially as described.

3. The process of treating starch which consists in taking the starch containing an amount of moisture equal to that which it contains in the green state and dropping it through an inclosed area and subjecting it during such dropping action to a current of heated moisture carrying gas, substantially as described.

4. The process of reducing green starch to a gritty state, which consists in dropping the starch into contact with a heated moisture-carrying gaseous body then drying and disintegrating the starch, substantially as described.

5. The process of reducing starch from a powdered form to a gritty form which consists in introducing the starch in a finely dispersed body with moisture contained therein into contact with a body of moisture-carrying heated gaseous matter of a temperature sufficient to semi-gelatinize the starch, substantially as described.

6. The process of transforming starch into a mass of gritty, granulated particles, which consists in dropping the starch in a form containing moisture through a body of steam, and then drying the starch and disintegrating the same, substantially as described.

7. The process of transforming starch into a mass of gritty, granular particles which consists in dropping the starch in a powdered form containing moisture through a body of steam of a temperature sufficient to semi-gelatinize the starch, then drying the agglomerated particles produced and then disintegrating said product, substantially as described.

Signed at New York, in the county of New York, and State of New York, this 24th day of April, A. D. 1911.

FREDERICK PENTZ BERGH.
HENRY C. NEUBERGER.

Witnesses:
M. L. RYAN,
DAVID M. NEUBERGER.